US010216960B2

(12) United States Patent
Mushkatblat

(10) Patent No.: US 10,216,960 B2
(45) Date of Patent: *Feb. 26, 2019

(54) DATA MASKING SYSTEMS AND METHODS

(71) Applicant: Yevgeniya Mushkatblat, Studio City, CA (US)

(72) Inventor: Yevgeniya Mushkatblat, Studio City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/889,176

(22) Filed: Feb. 5, 2018

(65) Prior Publication Data
US 2018/0173897 A1    Jun. 21, 2018

Related U.S. Application Data

(63) Continuation of application No. 14/450,169, filed on Aug. 1, 2014, now Pat. No. 9,886,593.

(60) Provisional application No. 61/861,872, filed on Aug. 2, 2013.

(51) Int. Cl.
G06F 21/62    (2013.01)
G06F 11/36    (2006.01)

(52) U.S. Cl.
CPC ...... *G06F 21/6254* (2013.01); *G06F 11/3672* (2013.01)

(58) Field of Classification Search
CPC .............................. G06F 21/60; G06F 21/6254
See application file for complete search history.

(56) References Cited

U.S. PATENT DOCUMENTS

| | | | |
|---|---|---|---|
| 2008/0133934 A1* | 6/2008 | Gopinath ............ | G06F 11/3672 713/189 |
| 2009/0327800 A1* | 12/2009 | Kim .................... | G06F 11/1044 714/5.11 |
| 2011/0270837 A1* | 11/2011 | Raj ..................... | G06F 21/6227 707/737 |
| 2012/0272329 A1* | 10/2012 | Grammer ............ | G06F 21/6245 726/26 |
| 2013/0290254 A1* | 10/2013 | Ould-Ahmed-Vall ...................... G06F 9/30036 707/626 |

* cited by examiner

*Primary Examiner* — Harunur Rashid
(74) *Attorney, Agent, or Firm* — Kumar Maheshwari

(57) ABSTRACT

Embodiments include a method for data masking such as receiving, by a first data masking component, data including unmasked data for a first attribute, the first data masking component including a data set and a masking algorithm; generating, by the first data masking component, masked attribute data for the first attribute by applying the masking algorithm to the unmasked data associated with the first attribute using the data set; and replacing, by the first data masking component, the data for the first attribute in the first data with the masked attribute data.

20 Claims, 10 Drawing Sheets

DATA MASKING SYSTEMS AND METHODS

CROSS REFERENCE TO RELATED APPLICATION

This application is a continuation application of Non-Provisional patent application Ser. No. 14/450,169, which is incorporated herein by reference in its entirety. This application claims the benefit of Provisional Patent Application No. 61/861,872, filed Aug. 2, 2013, which is incorporated herein by reference in its entirety.

BACKGROUND

Software development lifecycle is widely understood as a process of developing, testing, integrating, and producing tested code and associated data to the end user for further utilization in the business process. After these phases in the development process, code and data are created and propagated through a series of purposed environments into a production environment. After the initial development stage, the maintenance stage follows during which further iterations of development of new features takes place.

After the initial launch of a software product, users start utilizing the product. As a result of users utilizing the product, "production data" is generated. A preproduction environment can be then populated with the data from the production environment. Data in the preproduction environment that closely resembles the "production data" allows developers and testers to better understand how to further improve the product.

To populate data in the pre-production environment from the production environment, subsets of data can be copied into the preproduction environment from the production environment. In some industries, the data in the production environment is sensitive to exposure including to exposure to the pre-production environment. There are data protection regulations in place in various industries including banking (e.g., GLBA), health care (e.g., HIPAA), e-commerce (e.g., PCI DSS, PIPEDA), financial compliance (e.g., SOX), and others. Many regulations require minimal data exposure of sensitive data in the pre-production environments.

SUMMARY

At least one aspect is directed to a method for data masking. The method includes receiving, by a first data masking component, data including unmasked data for a first attribute, the first data masking component including a data set and a masking algorithm. The method further includes generating, by the first data masking component, masked attribute data for the first attribute by applying the masking algorithm to the unmasked data associated with the first attribute using the data set. The method further includes replacing, by the first data masking component, the data for the first attribute in the first data with the masked attribute data.

At least one aspect is directed to a system. The system includes: one or more data processors; and one or more storage devices storing instructions that, when executed by the one or more data processors, cause the one or more data processors to perform operations comprising: one or more data processors; one or more storage devices; and a first data masking component storing instructions that, when executed by the one or more data processors, cause the one or more data processors to perform operations comprising: receive data including unmasked data for a first attribute, the first data masking component including a data set and a masking algorithm; generate masked attribute data for the first attribute by applying the masking algorithm to the unmasked data associated with the first attribute using the data set; and replace the data for the first attribute in the first data with the masked attribute data.

A computer-readable storage medium having instructions to provide information via a computer network, the instructions comprising instructions to: receiving, by a first data masking component, data including unmasked data for a first attribute, the first data masking component including a data set and a masking algorithm; generating, by the first data masking component, masked attribute data for the first attribute by applying the masking algorithm to the unmasked data associated with the first attribute using the data set; and replacing, by the first data masking component, the data for the first attribute in the first data with the masked attribute data.

DETAILED DESCRIPTION

Figure 1:
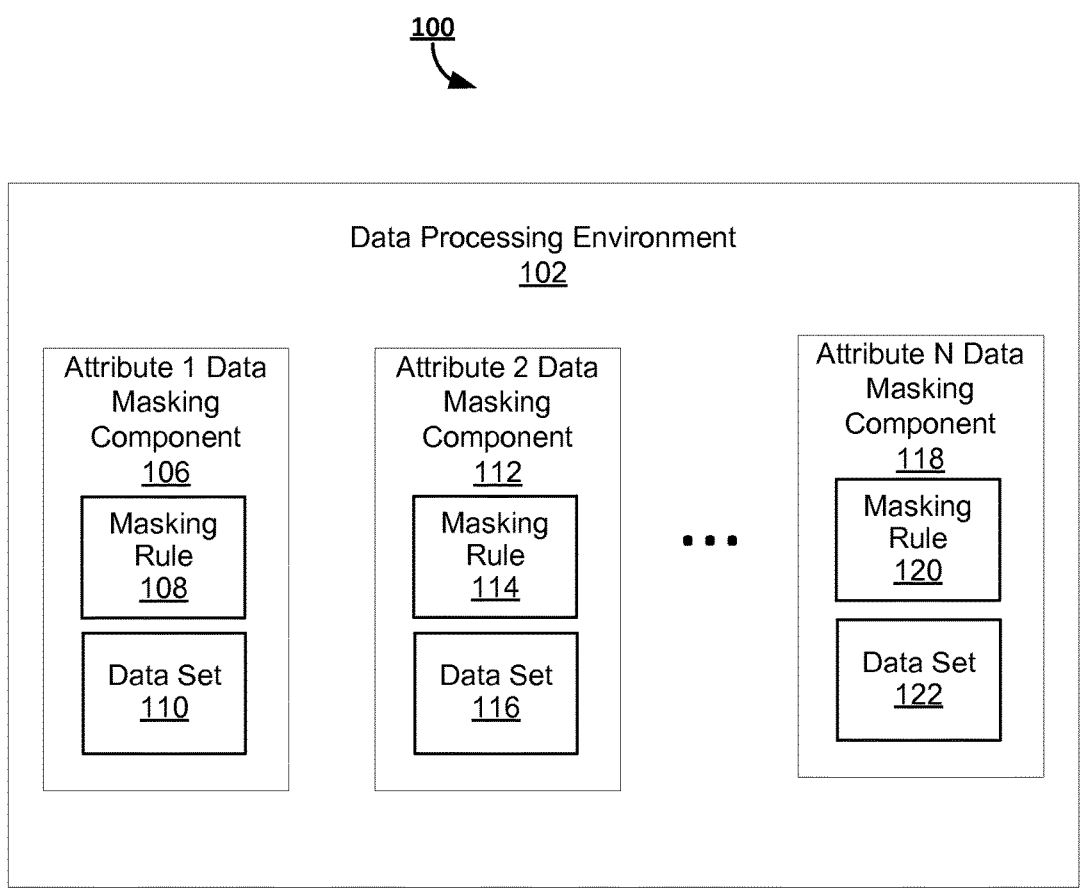
FIG. 1 is a block diagram of a data processing environment comprising multiple standalone data masking components, in an accordance with a described implementation.

In accordance with various embodiments, stand-alone data masking components (e.g., interfacing software modules) may provide masking functionality. Each data masking component may provide masking functionality for a single data attribute. A data masking component may include a masking rule and a data set. Each of the data masking components may generates masked data for a particular attribute using the data set and the masking rule encapsulated within the data masking component. Accordingly, the data masking component does not need to perform data mining and instead relies on the data set included in the data masking component itself.

The data masking components may each provide masking data for a particular attribute, and may be incorporated into a platform or into a data processing system. In some embodiments, only the data masking components that mask attributes that are actually utilized by the platform or the data processing system are installed in the platform or the data processing. For example, if there are thirty available data masking components, and the platform actually works with twenty of those attributes, then twenty data masking components would be installed into the platform that mask the data for the twenty attributes that are utilized by the platform. In this example, each of the twenty data masking components provides masking data for an attribute that is utilized by the platform by relying on the data set and the masking rule included in the data masking component.

Each data masking component masks a single attribute to allow for a greater degree of flexibility. Advantageously, learning curve and licensing costs may be reduced. The embodiments disclosed herein may reduce overhead for custom solution implementations, development time, learning curve, computational cycles, and networking overhead for on-the-fly, server-to-server data flow architecture from production to development. The data masking components provide a robust, coherent performance, and better separation of data fields as a data masking solution. Data that is processed by the platform or the data processing environment may represent a physical object such as a person.

The atomic rule-based, stand-alone data masking components may be each defined for a specific business taxonomy element/attribute. These components may ease and accelerate development of data flows that deliver masked data. In some embodiments, the data masking component may integrate into the extendable frameworks of existing extract, transform, and load ("ETL") tools and other distributed tools via the tools' predefined APIs. In some implementations, the tools' APIs can be based on an extensible-markup-language. In various embodiments, there are two ways the tools' API may be implemented. In one example embodiment, the tool may be a component that is not part of SSIS it is done as a call to a class. (e.g., xxx.xxx.xxx.method (param1, param2 . . . )). In another example embodiment, the tool is accessible in a component form that is part of SSIS which decidedly XML and covers calls to the components registered in global assembly cache and based on common signatures per SSIS framework definition. Accordingly, the API may be implemented in various ways. Developers or administrative users can mix and match data masking components into the solution, selecting only those components that are aimed at masking the necessary elements or attributes (e.g., social security number, name, date of birth, etc.). Different industries regulate different data elements to be masked. Thus, these regulations dictate the rules and components to be used.

The component taxonomy based model may extend to single-algorithm based services. The data masking components may integrate into the tool's set of services that can be predefined by the tool vendor's architecture service APIs. The components may conform to various industry specific protocols including SOAP, REST, MADI, HL7, ISO 8583, and PCI security protocol, etc. The atomic-rule, taxonomy-based components and services can be called at any point of the data flow and can be executed both in linear sequence and/or in parallel. The data masking components and services can be packaged into the application as a single component or transformation and called from the variety of the applications autonomously. The components can be executed with the purpose of masking, on any server, which may in a production environment, a development environment, or in an intermediary environment. These autonomous data masking components and services provide both flexible and an economical way to develop in the environments where resources are scarce (e.g., if the environment is not a priority in terms of resource capacities).

Each data masking component is based on one of the data masking algorithms such that its implementation satisfies the content, structure, and the format of the data attribute. The components implementing set based algorithms, such as set based substitution, include dictionaries of values to randomly choose from as part of the component architecture. In some embodiments, the data masking components utilize randomness, such as encryption and random substitution on numeric data. In these embodiments, GFSR algorithms for better randomness and security compliance may be utilized. In other embodiments, values may be randomly chosen from a component architecture, values may be chosen in a consistent psedo-random, such as but not limited to, encryption and random substitution. In other embodiments, values may be chosen by modified encryption, random substitution or psedo-random consistent substitution or any algorithm providing substitution in the pre-defined manner.

All data masking components can comply with the framework architecture as defined by a vendor, including error handling, variable handling, specific libraries and namespace conventions and GUI uniformity. As described herein, a variety of other features and advantages can be incorporated into the technologies as desired. The foregoing and other features and advantages will become more apparent from the following detailed description of disclosed embodiments, which proceeds with reference to the accompanying drawings.

FIG. 1 illustrates a data processing environment 102 comprising attribute 1 data masking component 106, attribute 2 data masking component 112 through attribute N data masking component 118. The data processing environment 102 can include any number of attribute specific data masking components, where each component is responsible for masking one particular attribute. In some implementations, only the data masking components that are needed for data processing to be performed by the data processing environment 102 are included (e.g., installed) in the data processing environment 102. For example, if the data processing environment does not process attribute 20, the data masking component that is configured to mask data for the attribute 20 is not installed or included in the data processing environment 102.

In one implementation, the data processing environment can be an ETL tool that utilizes the components 106, 112 through 118 to mask attributes. The data processing environment can be a pre-production environment, a development environment, or a production environment.

As shown in FIG. 1, each data masking component includes a data set and masking rule. In some embodiments, each data masking component utilizes its own data and masking rule to mask the attribute data, and does not rely on other data that may be maintained by the data processing environment 102. Although not shown, each of the data masking components may include an input interface, an error interface, an output interface, and/or other interfaces.

The attribute 1 data masking component 106 includes a masking rule 108 and a data set 110. The data masking component 106 is configured to mask data only for attribute 1 using the masking rule 108 and the data set 110. The attribute 1 can be any attribute including, but not limited to, credit card number, social security number, birth date, etc.

The data set 110 includes values for masking data for the attribute 1. The data set 110 may include indexed values, and the indexed values may be used by the masking rule 108 to generate a masking value for the data for attribute 1. For example, the data masking component 106 may be configured to mask last name attribute values. In this example, the data set 110 may include a plurality of last name values.

The masking rule 108 may be a hashing function that is used by the data masking component 106 to mask the attribute 1 value using the indexed values in the data set 110. In one implementation, a random or pseudo-random number is generated and utilized to select an index from the data set 110. The value corresponding to the selected index is the masking attribute 1 value, which replaces the unmasked attribute 1 value.

The attribute 2 data masking component 112 includes a masking rule 114 and a data set 116. The data masking component 112 is configured to mask data only for attribute 2 using the masking rule 114 and the data set 116. The attribute 2 can be any attribute including, but not limited to, credit card number, social security number, birth date, etc. The data set 116 includes values for masking data for the attribute 2. The data set 116 may include indexed values, and the indexed values may be used by the masking rule 114 to generate a masking value for the data for attribute 2. The masking rule 114 may be a hashing function that is used by the data masking component 112 to mask the attribute 2 value using the indexed values in the data set 116.

The attribute N data masking component 118 includes a masking rule 120 and a data set 122. The data masking component 118 is configured to mask data only for attribute N using the masking rule 120 and the data set 122. The attribute N can be any attribute including, but not limited to, credit card number, social security number, birth date, etc. The data set 122 includes values for masking data for the attribute N. The data set 116 may include indexed values, and the indexed values may be used by the masking rule 114 to generate a masking value for the data for attribute 2. The masking rule 114 may be a hashing function that is used by the data masking component 112 to mask the attribute 2 value using the indexed values in the data set 116.

Each of the data masking components may enclose a single masking algorithm. The masking algorithm/rule may be applied to substitute, shuffle, or encrypt a specified data field based on the natural language definition of the data field. Each of the reusable data masking components may be integrated into a framework (e.g., data processing environment 102) and mask received data. Each of the data masking components may be configured to execute the one masking algorithm to generate masked data. Thus, the masking functionality for a particular attribute is enclosed in a standalone component. Each data masking component is designed to apply a data-masking algorithm per source data element on entry and produce masked data on exit.

In some embodiments, the data masking components may confirm to the API rules and programming standards of an ETL tool framework and maintaining all the specified properties of such framework including data storage, asynchronous and synchronous data processing methodology, communication protocols, parameterization and error handling. The data masking component can be transformed into a stand-alone module independent of the ETL framework invocation and execution by a host program. One data masking component can execute in parallel with other data masking components or in sequence in order to transform the data into its masked format.

Figure 2:
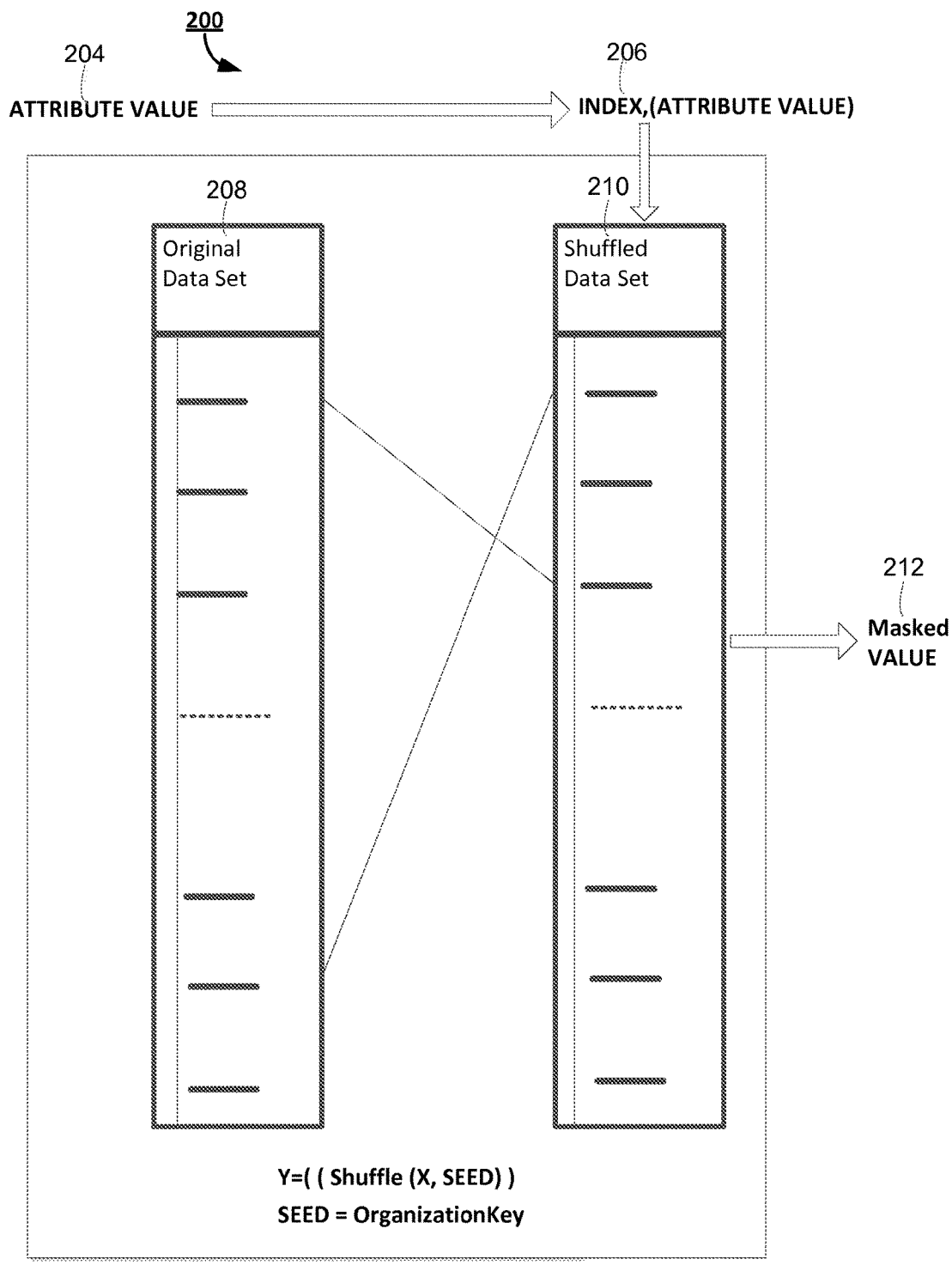
FIG. 2 is a block diagram illustrating shuffling original data set to produce a shuffled data set used for masking attribute values, in an accordance with a described implementation.

FIG. 2 illustrates a diagram 200 in which shuffled data set 210 is generated from an original data set 208, and a masked value is determined using the shuffled data set 210. The diagram 200 illustrates the original data set 208 and the shuffled data set 210. In some implementations, each of the data masking components (e.g., component 106, 112 through 118) in the data processing environment 102 may contain a shuffled dataset that is related to the attribute associated with the respective data masking component. In these implementations, each data masking component may include a shuffled data set, which is a dictionary of values, of which all the values are indexed. When a data masking component is installed in a data processing environment, the data masking component is installed with the dictionary.

The dictionary (e.g., the shuffled data set) can be stored as an in-memory structure or as a file, and in both variations, the initial indexing is the same. A "key" may be selected (e.g., by a client) and utilized for distributing the dictionary in the order specific to that particular vendor or client. The unique order of the dictionary is created based on the selected key and an algorithm (e.g., a "random" function, a "hash" function) that is used to generate the shuffled data set. Thus, generation of the shuffled data set is repeatable such that every time the same unique indexing is created.

In order to map the unique entry value, a data masking component uses a masking rule (e.g., masking rule 108, masking rule 114, etc.). In some implementation, the masking rule may be any one-way mapping function (e.g., "hash" function). A particular index is a result of applying the function on the original value.

Based on the index value, the masked attribute value is determined. The masked attribute value may be considered "compound" value, and may be broken into parts on the principles that correspond to either data structure rules or to the performance effectiveness. The length of the partial strings (of the masked attribute value) can be regulated.

In case of complex interrelated data of compound entities in the component, the algorithm/rule first evaluates the relationship among the data entities and then shuffles and maps all the compound elements in correspondence with the rule predefined within the relationship (e.g., one-to-one relationship, one-to-many relationship, many-to-one relationship, or many-to-many relationship).

Figure 3:
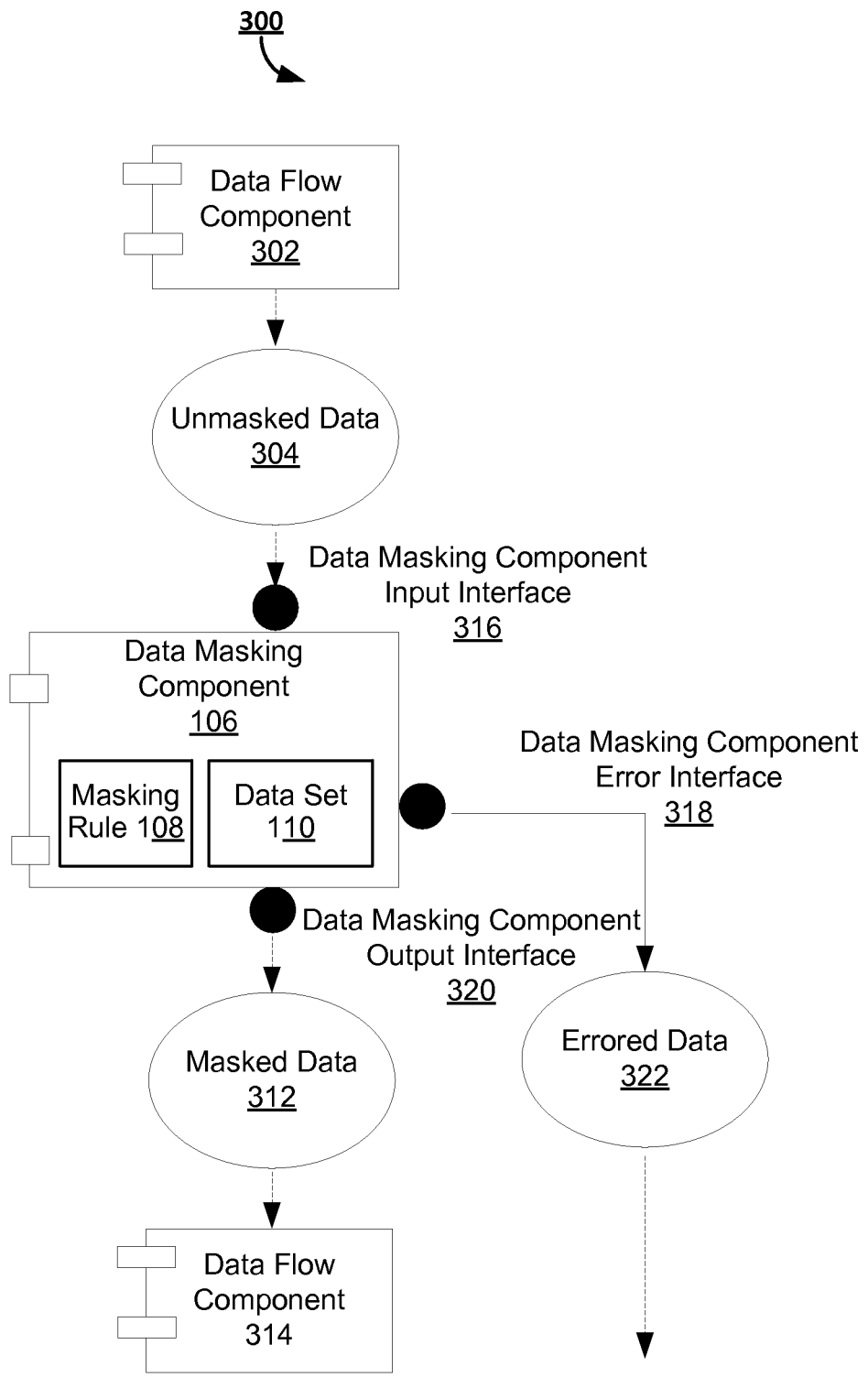
FIG. 3 is a block diagram of a data flow employing a data masking component, in an accordance with a described implementation.

FIG. 3 illustrates a diagram 300 of masking data value of a particular attribute using a data masking component 106. The data masking component 106 is configured to mask data for the attribute 1. A data flow component 302 transmits unmasked data 304 to the data masking component 106. The data masking component 106 is configured to mask data for the attribute 1. In some implementations, the unmasked data 304 may include unmasked data for the attribute 1 (e.g., credit card number value). In other implementations, the unmasked data 304 may include data for the attribute 1 and other data, which may include unmasked data for other attributes.

The data flow component 302 may be executed in the data flow prior to the execution of data masking steps of the diagram 300. The data flow component may be part of a data processing environment (e.g., the data processing environment 102).

A data masking component input interface 316 of the data masking component 130 may match metadata of the received unmasked data 304. For example, the data masking component input interface 316 (or another module or interface of the data masking component 106) may identify the data type of the unmasked data and compare it to the data type that the data masking component accepts for processing. In the event that the data type of unmasked data is incompatible with the data masking component's 106 expected data type, the data masking component 106 sends error data 322 via a data masking component error interface 318. The error data may include information related to the unmasked data including, but not limited to, one or more error codes and/or description of the error. For example, an error code may indicate that a data type incompatibility was identified.

In some embodiments, the data masking component input interface 316 does not perform a check that the taxonomy of the unmasked data 304 is correct, and proceeds to apply the masking rule 108 specific to the component 106 in an asynchronous mode, providing masked data 108 on the output. The data masking component 106 outputs the masked data via the data masking component user interface 320 to the data flow component 314. The data masking component 106 provides an error data output 322 via the data masking component error interface 315 for the values that did not match the format or taxonomy of the attribute.

The data masking component 106 may provide the masked data 312 via a data masking component output interface 320. In some implementations, the masked data may be provided via the RAM memory buffer, and may confirm to the API of the data flow component 314. In some implementations, the data flow component 302 and the data flow component 314 are the same component. In other implementations, the data flow component 302 and the data flow component 314 are two different components.

Figure 4:
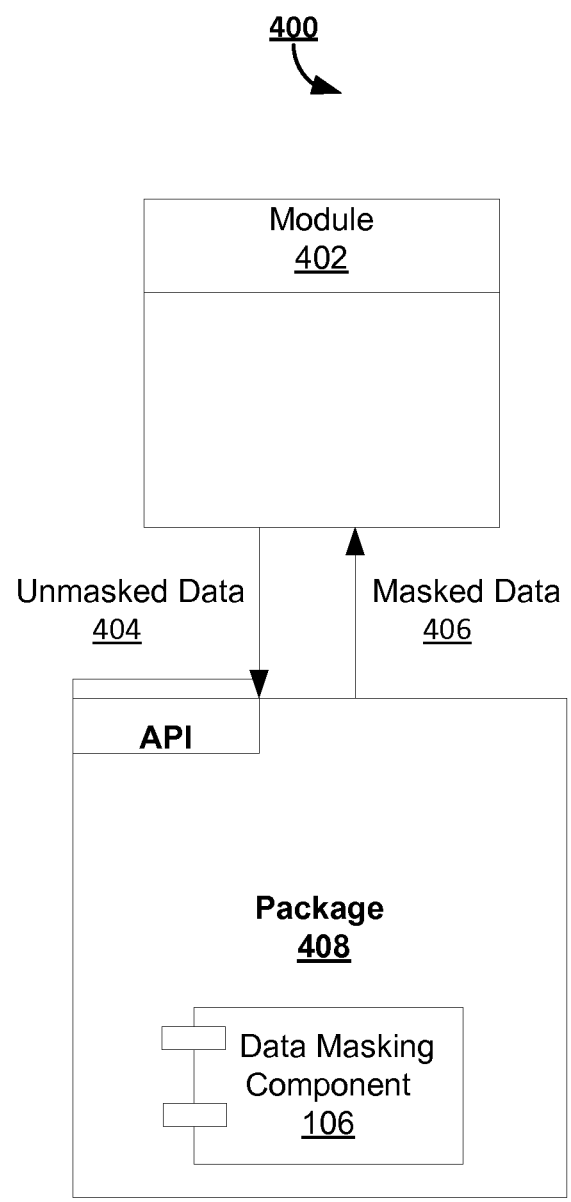
FIG. 4 is a block diagram of a production application module executing a data masking component wrapped as a stand-alone package, in an accordance with a described implementation.

FIG. 4 illustrates the data masking component 106 wrapped as a stand-alone module such as an SSIS package 408 that can be independently deployed. The data masking component 106 itself may be tightly integrated into the pipeline architecture of the data flow. The data masking component 106 may be wrapped into the module that provides external interface such that an application module 402 can be used on invocation. In the event that data needs to be masked in the production environment in real-time or in near real-time, the application module 402 issues the call to the stand-alone package 408, and the data masking component 106 performs the masking of the data.

Unmasked data 404 is received from the module 402 by the package 408 via an API. The unmasked data may include unmasked data for attribute 1 only. In another example, the unmasked data 404 may include unmasked data for attribute 1 and other data. The data masking component 404 processes the attribute 1 data included in unmasked data 404. The data associated with attribute 1 is unmasked on input and masked on output, giving error in case of value non-conforming to format. For example, if the attribute 1 is credit card number, then the unmasked data may include an unmasked credit card number value. In this example, the data masking component 106 masks the credit card number value, and the masked data 406 includes masked credit card number value.

Figure 5:
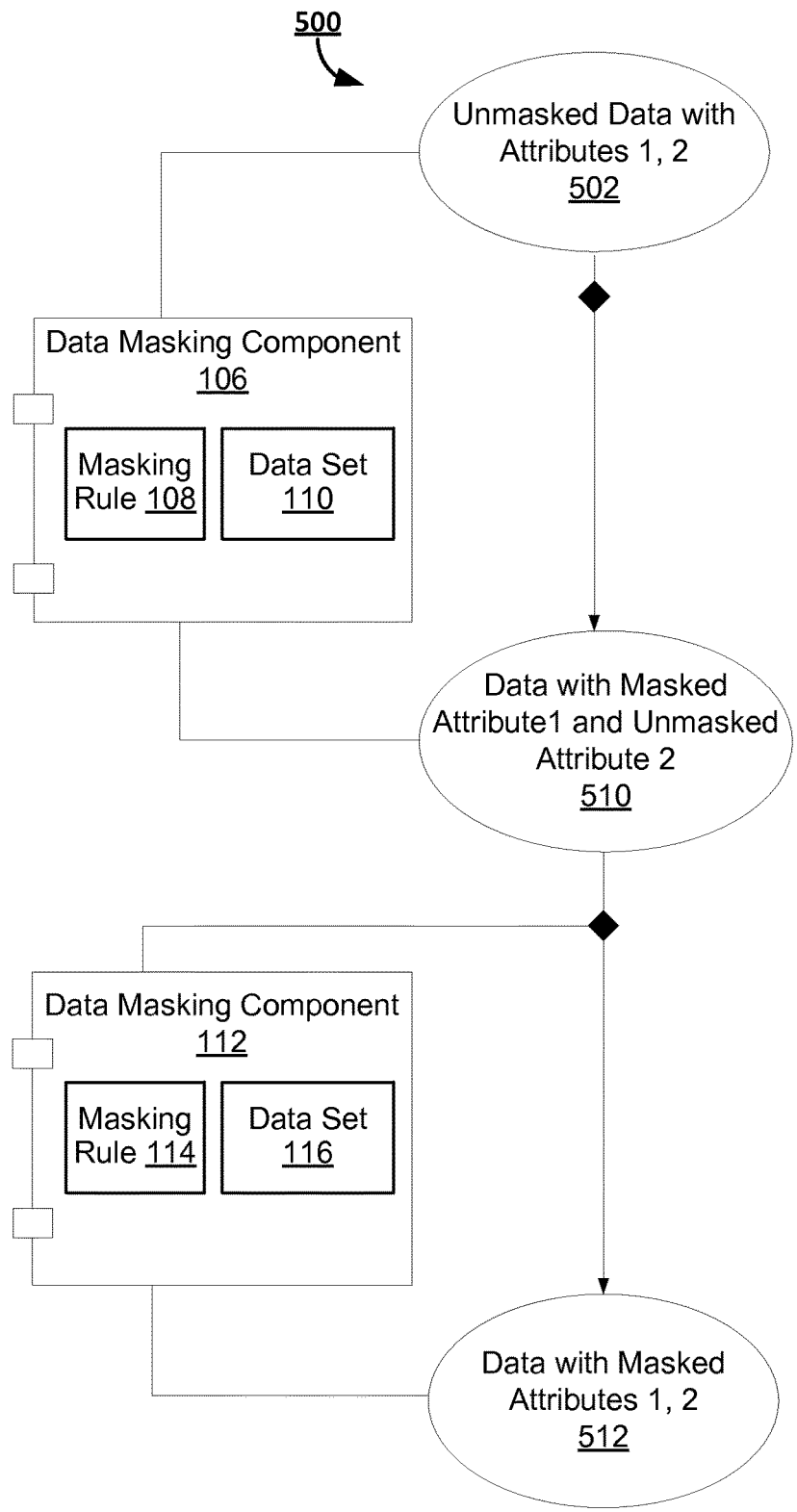
FIG. 5 is a block diagram of two data masking components invoked in a sequential manner, in an accordance with a described implementation.

FIG. 5 illustrates a process 500 of masking two attributes using two data masking components, where each of the two components masks one of the two attributes in a sequential order. An unmasked data 502 includes two attributes (attribute 1 and attribute 2) in the entity that requires masking. For example, the attribute 1 is an address, and attribute 2 is a zip code. In this example, the unmasked data 502 may include the following data:

| Address Id | Address1 Address2 | City | State | Zip |
|---|---|---|---|---|
| 123 | 44 Brick Plaza | Brick | NJ | 08723 |

The data masking component 106 may utilize a concatenation of substituted value and a sequential value algorithm for the address in the following manner:
"44 Brick Plaza"→"123 Address Plaza"

The data masking component 106 receives unmasked data 502 for attribute 1 (i.e., address). The masking rule 108 is applied to the unmasked attribute 1 using the data set 110. The address values in the unmasked data 502 are replaced with the value of the generated masked address substitute forming the data 510 having masked attribute 1 and unmasked attribute 2. The data masking component 106 outputs data 510 with masked attribute 1, while maintaining unmasked state of attribute 2. The data 510 is transmitted to the data masking component 112 for masking the attribute 2 data. The data masking component 112 receives the data 510 and replaces a zip code value with the random zip code value with a masked zip code value generated using the data masking rule 114 associated with the data masking component 112.

In some embodiments, a user (e.g., a developer) may create the data masking components and the associated masking rules, as every entity masking can have implementations with several algorithms. Complexity of the masking rules and formula based versus set-based operations may affect the performance. The requirements of the application (in which data masking components are utilized) may necessitate specific use to maintain particular attributes of the entity.

Each of the masking rules 108 and 114 utilize the complete data set that is associated with their respective data masking component. Therefore, the masking rules are performed one at a time on the complete set of values of both Addresses and Zip Codes entities, which are associated with the respective data masking components. The masking components can be as multiple as necessary in a sequence of the data flow.

Figure 6:
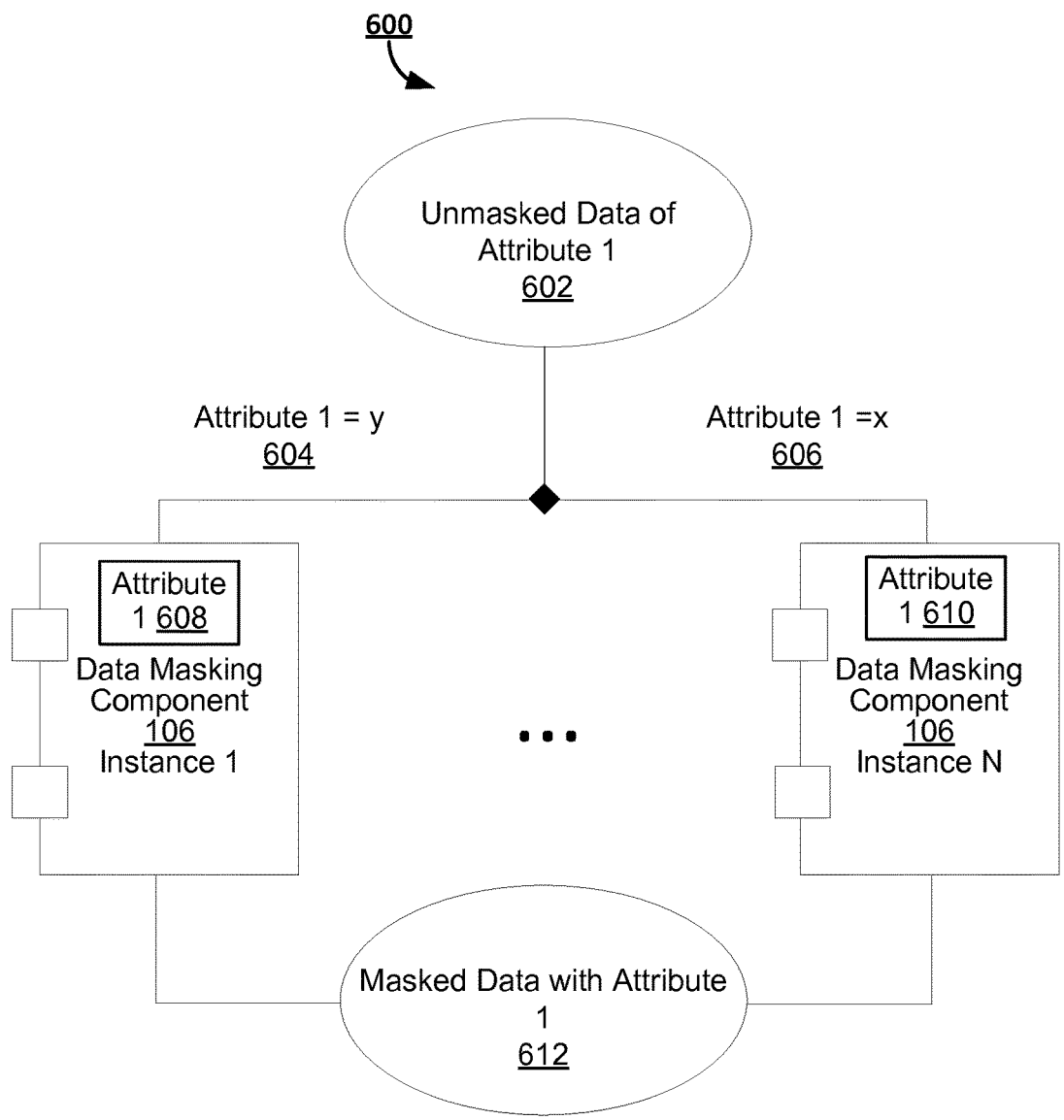
FIG. 6 is a block diagram illustrating parallel invocation of two or more instances of the same data masking component, in an accordance with a described implementation.

FIG. 6 illustrates a process 600 of masking unmasked data of a single attribute by utilizing the same data masking component 206 in parallel. As shown, unmasked data 602 of attribute 1 is received by multiple instances of the data masking component 106. The data masking occurs on the same data field (i.e., attribute 1 value). The unmasked data 602 set may be split arbitrarily based on field definitions 604 and 606, or sequential value. For example, the field definitions may be gender of the person, and are used to partition the data for masking another attribute (e.g., the first name).

The process 600 invokes instances of the components 420 and 450 in parallel. The multiple instances of the data masking component 106 consume the values of the data fields 608 and 610 and apply the same masking rule 108. The resulting masked data 612 is output and merged for further processing.

Figure 7:
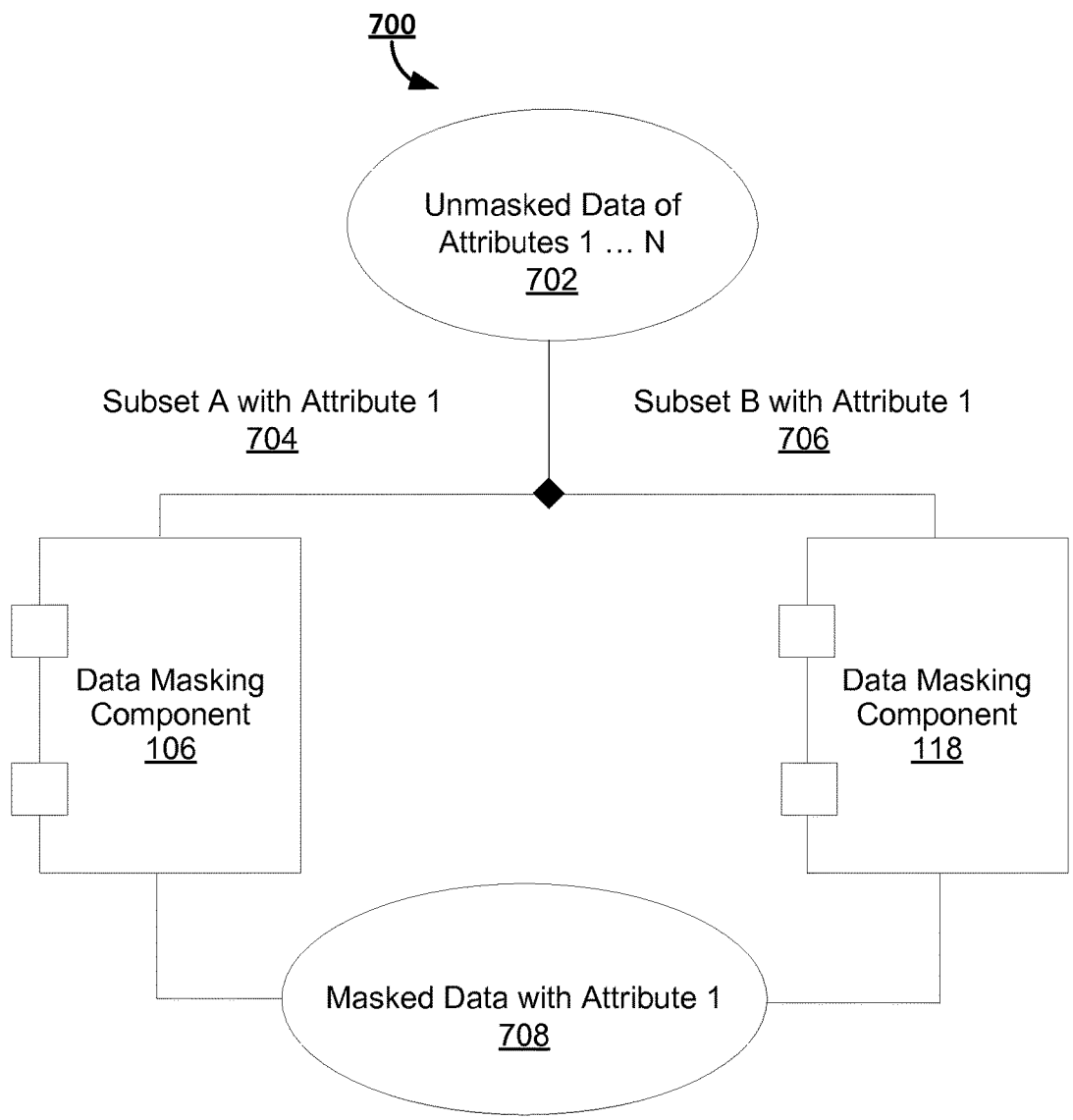
FIG. 7 is a block diagram illustrates parallel invocation of two or more different data masking components, in an accordance with a described implementation.

FIG. 7 illustrates a process 700 of masking data using two and more different data masking components in parallel in the data flow. As shown in FIG. 7, the unmasked data 702 of attribute 1 is masked with two and more different data masking components. For example, the entity's field may contain data with values indicating different relationship. In this example, the data is split and processed according to different rules of different components.

In one example, the unmasked data 702 is primary account number ("PAN") data. The unmasked data 702 may be split according to the first digit into subset A 704 and subset B 706. The split data 704 and 706 is then processed with different masking rules of the data masking components 106 and 118. For example, the data masking components 106, 118 and other data masking components may mask different types of credit cards including Visa, Master Card, Discover, American Express and airline mileage cards with corresponding masking algorithms. In this example, the data masking component 106 may mask Visa PANs, while the data masking component 118 may mask the Master Card PANs. The split unmasked data 502 is process by the different data masking components 106 through 118 and is outputted in its masked form 708 and merged into for further processing.

The process 700 may improve performance with high parallelization. The process 700 invokes data masking components with different rules for the format as the character composition, length and check rules differ per standards of the ISO/IEC 7812.

Figure 8:
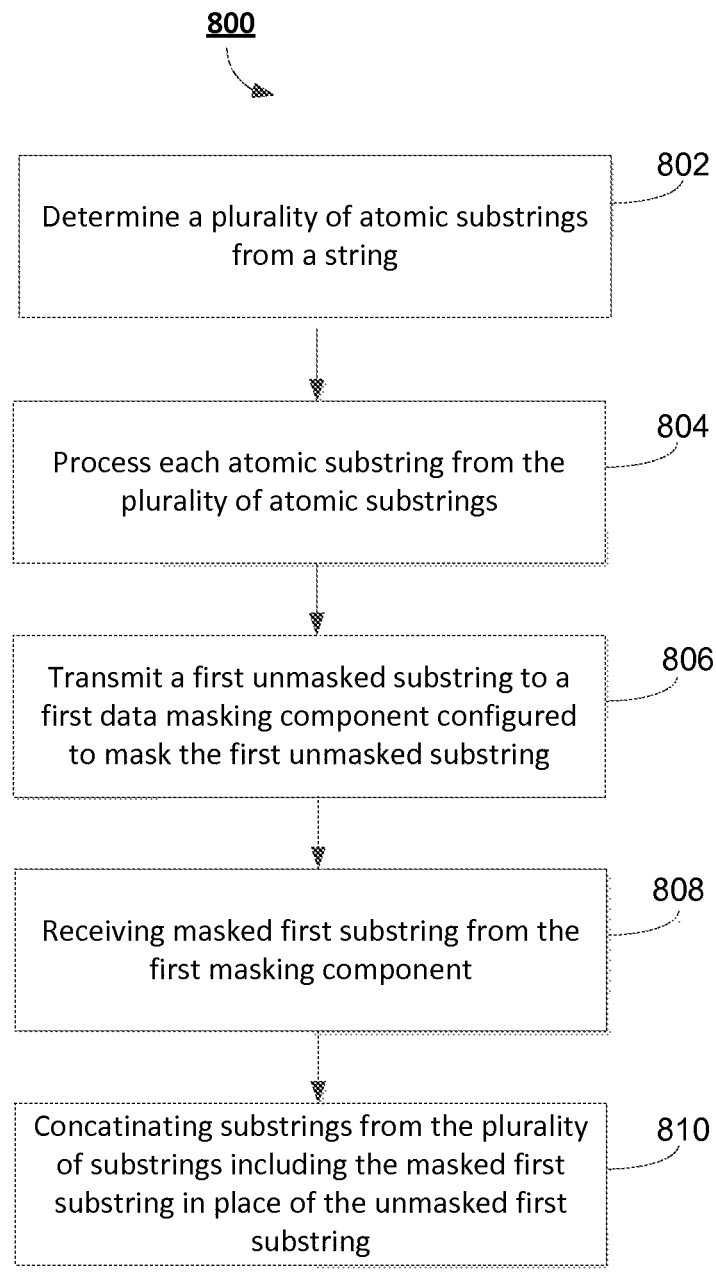
FIG. 8 is a flow diagram of a process for processing unmasked portion of a string of data, in an accordance with a described implementation.

FIG. 8 is a flow diagram of a process 800 for processing an unmasked portion of a string of data, in accordance with an illustrative implementation. The process 800 can be implemented in a data processing environment 102. In one implementation, the process 800 is encoded on a computer-readable medium that contains instructions that, when executed by the computing device, cause the computing device to perform operations of the process 800.

A plurality of atomic substrings are determined (802) from a string. The string can include multiple atomic substrings. For example, the substrings can be values for attributes including, but not limited to, person name, address, primary account number, birth date, etc. Some of the substrings may include values that are of sensitive nature and require masking. For example, the string may originate in a production environment, and portions of the string may need to be masked prior to storing the string in a pre-production or testing environment. In another example, the string may be received by the production environment and may need to be masked prior to storing by the production environment. The attributes that need to be masked may be predetermined. For example, these attributes may include credit card numbers, checking account numbers, address, birth day, or other information that may personally identify an individual.

Each atomic substring from the plurality of substrings is processed (804). The processing of each atomic substring may include determining whether the substring needs to be masked. A set of predetermined attributes that require masking may be utilized in determining whether an atomic substring needs masking. For example, metadata associated with an atomic substring may be compared to the data in the set of predetermined attributes. It may be determined that a first unmasked substring requires masking.

The first unmasked substring is transmitted (806) to a first data masking component. The first substring may include data for a first attribute. The first masking component may be configured to mask the first attribute. The first masking component may be any one of the data masking components shown in FIG. 1. The first masking component may include a rule, a data set, and one or more interfaces.

The first masked substring is received (808) from the first masking component. The first masked substring is generated by the first data masking component using the masking rule and the data set of the first data masking component. The first unmasked substring cannot be deducted from the first masked substring. Other substrings may be masked by other data masking components.

Substrings including the first masked substring are concatenated (810). The formed string includes the masked first substring in place of the unmasked first substring. Thus, the resulting string does not include unmasked data, which is replaced by masked data generated by the first data masking component.

Figure 9:
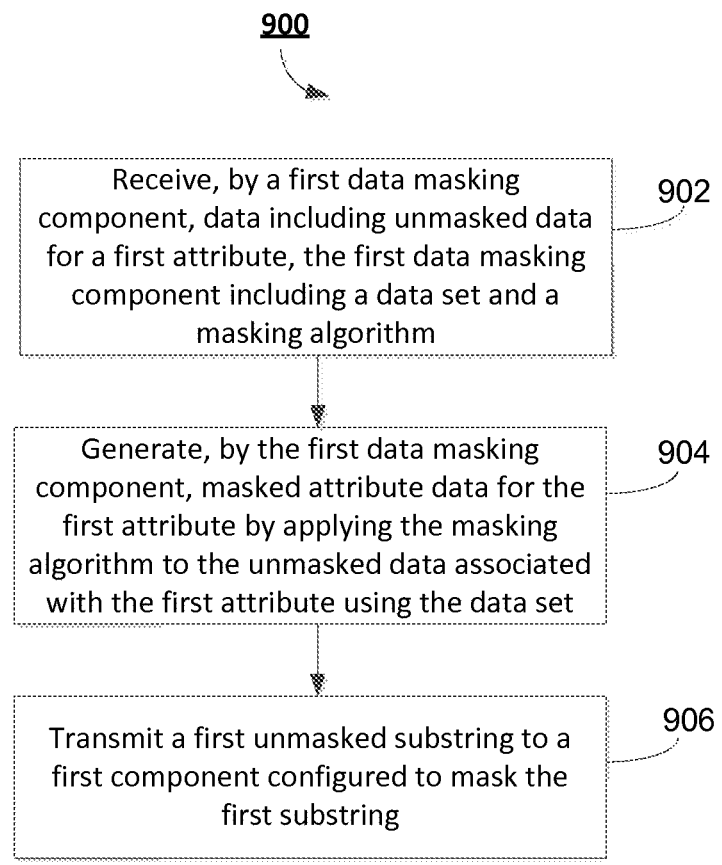
FIG. 9 is a flow diagram of a process for generating masked data, in an accordance with a described implementation.

FIG. 9 is a flow diagram of a process 900 for generating masked data, in accordance with an illustrative implementation. The process 900 can be implemented in a data masking component (e.g., data masking component 106). In one implementation, the process 900 is encoded on a computer-readable medium that contains instructions that, when executed by the computing device, cause the computing device to perform operations of the process 900.

Data is received (902), by a first data masking component, including unmasked data for a first attribute. The first data masking component including a data set and a masking rule or an algorithm. The values stored in the data set may be indexed. The indexes for the entries in the data set may be generated using a key and a first algorithm which may be different from the masking algorithm. The received data may further include unmasked data for any number of additional attributes (e.g., 5, 10, etc.).

Masked attribute data is generated (904) for the first attribute, by the first data masking component, by applying the masking algorithm to the unmasked data associated with the first attribute using the data set. In some implementations, an index in the dataset is selected by generating a random number or a pseudo-random number. In these implementations, the generated number is used to select an index from the data masking component, and the value corresponding to the index in the dataset is the masked attribute data. In other embodiments, the selected number may be generated by creating a random sequence of number or pseudo-random sequence. In some embodiments, the selected number may be supplied from outside as a key. In some embodiments, the components may be standalone or elements of frameworks.

The data for the first attribute in the first data is replaced (906), by the first data masking component, with the masked attribute data. The first data may include other unmasked data, which may be replaced with masked attribute data generated by one or more data masking components. Each of the one or more data masking components may be responsible for generating masking data for a particular attribute.

For example, the first data may further include unmasked data for the second attribute. In this example, the unmasked data for the second attribute may be transmitted to a second data masking component for masking the unmasked data for the second attribute. The second data masking component may include a second data set and a second masking algorithm, which the second data masking component may utilize for generating masked data for the unmasked data for the second attribute. The second data masking component may be configure to generate masking data only for the second attribute.

Figure 10:
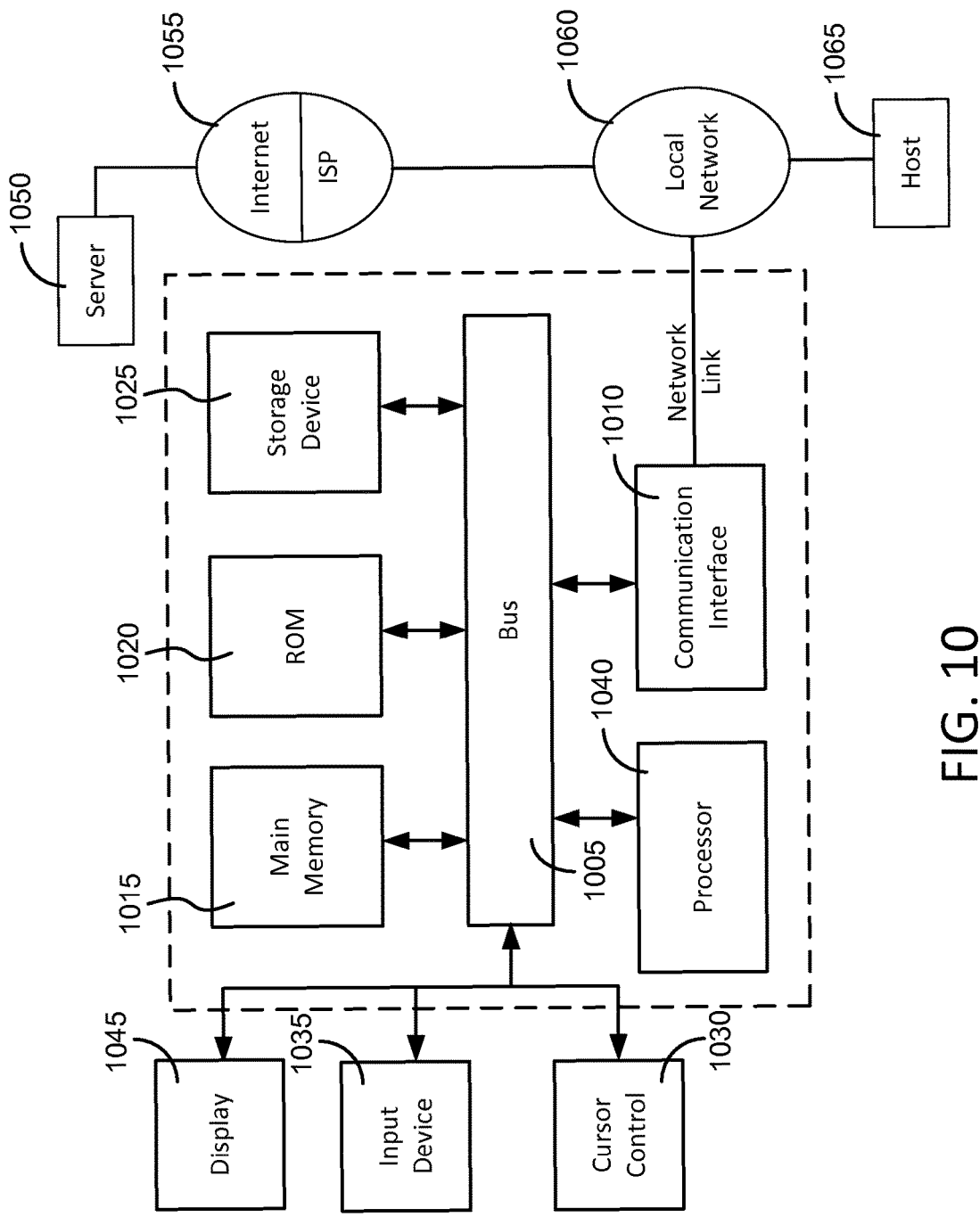
FIG. 10 is a block diagram that illustrates a computer system upon which various embodiments described herein may be implemented.

FIG. 10 is a block diagram that illustrates a computer system 1000 upon which various embodiments described herein may be implemented. Computer system 1000 includes a bus 1002 or other communication mechanism for communicating information, and a hardware processor 1004 coupled with bus 1002 for processing information. Hardware processor 1004 may be, for example, a general purpose microprocessor or one that is specifically programmed to perform the function described in this disclosure.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

The computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The computer system 1000 may implement the techniques described herein using customized hard-wired logic, one or more ASICs or FPGAs, firmware and/or program logic which in combination with the computer system causes or programs computer system 1000 to be a special-purpose machine. The computer system 1000 may be a data masking component. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile or non-transitory media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over, wireless network, a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the disclosure have been described with reference to numerous specific details that may vary from implementation to implementation. Thus, the sole and exclusive indicator of what is the disclosure, and is intended by the applicants to be the disclosure, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The embodiments are described with reference to drawings. The drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present disclosure have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the disclosure might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method for data masking, comprising:
receiving, by a data masking component computer system, a data set including unmasked data for a first and a second attributes, the data masking component including a first data masking method and a second data masking method;
generating a shuffled dataset of the unmasked data for the first and the second attributes;
repeating the generation of the shuffled dataset so that a unique indexing is created for the unmasked data in the shuffled dataset;
splitting the unmasked data into a first unmasked subset based on a first subset field definition and a second unmasked subset based on a second subset field definition;
generating parallelly, by the data masking component computer system,
  (a) a first masked subset for the first attribute for the first unmasked subset, by applying the first masking method to the unmasked data for the first attribute;
  (b) a second masked subset for the second attribute for the second unmasked subset, by applying the second masking method to the unmasked data for the second attribute; and
merging the first masked subset with the second masked subset.

2. The method of claim 1, wherein the receiving, by a first data masking component computer system, data including unmasked data for a first attribute further includes unmasked data for the second attribute.

3. The method of claim 1, wherein the masked attribute data for the first attribute further includes the unmasked data for the second attribute.

4. The method of claim 1, further comprising: merging first masked subset with the second unmasked subset based on a second subset field definition.

5. The method of claim 1, wherein unique indexes for entries in the data set are generated using a key and an algorithm.

6. The method of claim 1, wherein an index is selected by generating a pseudo random number or pseudo random sequence.

7. The method of claim 1, wherein the unmasked dataset is split arbitrarily based on sequential value before generating a shuffled dataset of the unmasked data for the first and the second attributes.

8. A system for reporting incompatibility of data during data masking, comprising: one or more data processors; one or more storage devices; one or more data masking component computer systems, configured to store instructions that, when executed by the one or more data processors, cause the one or more data processors to perform operations comprising:
receive, by at least of the data masking component computer system, a data set including unmasked data for a first attribute and a second attribute, the data masking component computer system including a first and a second data masking method;
generate a shuffled dataset of the unmasked data for the first attribute and the second attributes;
repeat the generation of the shuffled dataset so that a unique indexing is created for the unmasked data in the shuffled dataset;
split the unmasked data into a first unmasked subset based on a first subset field definition and a second unmasked subset based on a second subset field definition;
generate parallelly, by the data masking component computer system,
  (a) a first masked subset for a first attribute for the first unmasked subset, by applying the first data masking method to the unmasked data for the first attribute;
  (b) a second masked subset for a second attribute for the second unmasked subset, by applying the second data masking method to the unmasked data for the second attribute;
detect, by at least one of the data masking component system, incompatible data for at least one of the masking methods; and
report, by at least one of the data masking component computer system, an error message regarding the incompatible data.

9. The system of claim 8, wherein the error message is communicated by an error interface of the data masking component system.

10. The system of claim 8, wherein the error message further includes one or more error codes.

11. The system of claim 10, wherein the error codes further include one or more description of the errors related to incompatibility of the values and the format or taxonomy of the attribute.

12. A non-transitory computer-readable storage medium having instructions to provide information via a computer network, the instructions comprising instructions to:
receive, by a data masking component computer system, one or more data substrings of a data string, the data substrings including unmasked data set for a first and a second attribute, the data masking component including a first and a second data masking method;
generate a shuffled dataset of the unmasked data set for the first and second attribute;
repeat the generation of the shuffled dataset so that a unique indexing is created for the unmasked data in the shuffled dataset;
split the unmasked data set into a first unmasked data substring based on a first subset field definition and a second unmasked data substring based on a second subset field definition;
generate parallelly, by the data masking component computer system,
  (a) a first masked data substring for a first attribute for the first unmasked data substring, by applying the first masking method to the unmasked data substring for the first attribute;
  (b) a second masked data substring for a second attribute for the second unmasked data substring, by applying the second masking method to the unmasked data substring for the second attribute; and
concatenating the one or more masked data substrings to form a masked data string.

13. The non-transitory computer-readable storage medium of claim 12, wherein the unmasked substring cannot be deducted form from the masked substring.

14. The non-transitory computer-readable storage medium of claim 12, wherein the one or more substrings can be masked by different data masking components.

15. The non-transitory computer-readable storage medium of claim 12, wherein portions of the substring can be masked by the data masking components.

16. The non-transitory computer-readable storage medium of claim 12, wherein the attributes that need to be masked is predetermined.

17. The non-transitory computer-readable storage medium of claim 12, wherein the attributes that need to be masked is determined by comparing a data in the set of predetermined attributes.

18. The non-transitory computer-readable storage medium of claim 12, wherein the data masking component includes a rule, a data set and one or more interfaces.

19. The non-transitory computer-readable storage medium of claim 12, wherein a metadata associated with an atomic substring is compared to a data in a set of predetermined attributes.

20. The non-transitory computer-readable storage medium of claim 12, wherein the substrings have values for attributes chosen from a group consisting of a person's name, an address, a primary account number or birth date.

* * * * *